US005241019A

United States Patent [19]

Otsuki et al.

[11] Patent Number: 5,241,019

[45] Date of Patent: Aug. 31, 1993

[54] BINDER FOR DRY TONER

[75] Inventors: Tateo Otsuki; Kazuya Tsukamoto; Nobuhiro Hirayama, all of Kanagawa, Japan

[73] Assignee: Mitsui Toatsu Chemicals, Inc., Tokyo, Japan

[21] Appl. No.: 729,212

[22] Filed: Jul. 12, 1991

[30] Foreign Application Priority Data

Jul. 30, 1990 [JP] Japan .................................. 2-199059

[51] Int. Cl.[5] .............................................. C08F 20/10

[52] U.S. Cl. .................................... 525/437; 525/438; 525/445; 525/447; 525/448; 430/109; 430/904; 430/965

[58] Field of Search ............... 525/437, 438, 445, 447, 525/448; 430/109, 904, 965

[56] References Cited

U.S. PATENT DOCUMENTS

| | | | |
|---|---|---|---|
| 2,297,691 | 10/1942 | Carlson | 430/55 |
| 4,246,332 | 1/1981 | Tanaka et al. | 430/109 |

FOREIGN PATENT DOCUMENTS

| | | |
|---|---|---|
| 254543 | 1/1988 | European Pat. Off. . |
| 55-6895 | 2/1980 | Japan . |
| 59-45453 | 3/1984 | Japan . |
| 63-27855 | 2/1988 | Japan . |
| 63-127245 | 5/1988 | Japan . |
| 90/10893 | 9/1990 | PCT Int'l Appl. . |
| 2237399 | 5/1991 | United Kingdom . |

OTHER PUBLICATIONS

Patent Abstracts of Japan, vol. 6, No. 92 (P-119) (970) May 29, 1982; JPA 57-026855.

Patent Abstracts of Japan, vol. 12, No. 188 (P-711) (3035) Jun. 2, 1988; JPA 62-295068.

Patent Abstracts of Japan, vol. 6, No. 98 (C-106) (976) Jun. 8, 1982; JPA 57-030767.

Patent Abstracts of Japan, vol. 5, No. 8 (C-39) (680) Jan. 20, 1981; JPA 55-137170.

*Primary Examiner*—Samuel A. Acquah

*Attorney, Agent, or Firm*—Burns, Doane, Swecker & Mathis

[57] ABSTRACT

Herein disclosed is a binder for dry toners which comprises a copolymer resin obtained by reacting 10 to 50% by weight of a polyester resin which has free carboxyl groups, whose acid value ranges from 10 to 100 and whose number-average molecular weight ranges from 1,000 to 5,000 and 90 to 50% by weight of a mixture of a vinyl compound having a glycidyl group and the an another vinyl compound, wherein the amount of the vinyl compound having a glycidyl group corresponds to the number of the glycidyl groups equal to 0.25 to 1.5 time that of the carboxyl groups present in the polyester resin. The binder for dry toners is used in the electrophotography technique.

4 Claims, No Drawings

BINDER FOR DRY TONER

BACKGROUND OF THE INVENTION

1. Field of the Invention

The present invention relates to a binder for dry toners used for developing electrostatic latent images formed by electrophotography.

2. Description of the Prior Art

Up to now, there have been known a variety of electrophotographic methods such as those disclosed in U.S. Pat. No. 2,297,691 and Japanese Examined Patent Publication (hereinafter referred to as "J.P. KOKOKU") No. Sho 43-24748. In general, the electrophotographic method comprises forming various electrostatic latent images on a photoconductive element which is composed of a photoconductive material such as selenium, zinc oxide or cadmium sulfide according to various methods, electrically adhering toner particles to the latent images to give toner images and then transferring the toner images to a substrate such as paper to thus give a copy.

The heat fusing process by means of the heating roller has become the leading fixing method in electrophotography from the viewpoint of speeding up of the copying operations and of energy-saving. Moreover, it is necessary that the toner must be electrostatically electrified at a polarity falling within an optimum range through frictional contact thereof with a carrier in order to obtain clear images. For this reason, it has been desired to develop a resin as a binder for the toner which can withstand high speed copying operation and can provide copies of high quality.

Styrene-acrylic resins have been most widely used as the toner binders. These resins are cheap and have excellent resistance to humidity as well as high resistance to blocking, i.e., resistance to the phenomenon that toner particles are adhered to one another during the storage thereof or the so-called blocking phenomenon, but these resins have, on the contrary, low mechanical strength and low rate of electrification.

It has been known that polyester resins are excellent in mechanical strength and have a high rate of electrification, but have low resistance to humidity which in turn leads to lowering of the electrifying properties when humidity is high and the resins are relatively expensive.

Under such circumstances, there have been proposed many attempts for improving the properties of toner binders by coupling a styrene-acrylic resin with a polyester resin. For instance, Japanese Unexamined Patent Publication (hereinafter referred to as "J.P. KOKAI") No. Sho 63-127245 discloses a method which comprises melting and kneading a styrene-acrylic copolymer and a polyester resin in a twin-roll mill to react them. Moreover, J.P. KOKAI No. Sho 63-27855 discloses a method for preparing a resin for toner binders by reacting a crystalline polyester resin with an amorphous vinyl polymer Both of these patents utilize a polymer/polymer reaction. In general, the reaction rate of such polymer/polymer reactions is low and the end point of these reactions is also unclear. Thus, these methods suffer from problems in that the productivity is low and that the quality control of the resulting products is difficult.

Moreover, J.P. KOKAI No. Sho 59-45453 discloses a method for preparing a resin used as toner binders which comprises subjecting a polyester resin carrying terminal hydroxyl groups and (meth)acrylic acid to ester-condensation to form a polyester resin having at least one (meth)acryloyl group at the end of the molecule, dissolving the resulting polyester resin in a vinyl compound monomer and then polymerizing them. However, in this method, the rate of the esterification is low and the linkage between the polyester resin and the vinyl compound monomer is insufficient. Therefore, the resulting product is not acceptable as a toner binder.

SUMMARY OF THE INVENTION

Accordingly, one object of the present invention is generally to effectively form a linkage between a polyester resin component and a vinyl copolymer resin component to thus eliminate drawbacks of both these resins to thus provide a resin which is excellent in mechanical strength and toner properties such as electrifying properties, which can be prepared in good productivity and whose quality control is very easy.

The ultimate object of the present invention is thus to provide a binder for dry toners which is excellent in pulverizing properties as toners, resistance to blocking, low temperature fixing ability, resistance to offset, rate of electrification and electrification under high humidity conditions, which can withstand high speed copying operations and which can provide copies of high quality.

The inventors of this invention have conducted intensive studies to achieve the aforementioned object, have found out that good results can be obtained through the use of a copolymer resin obtained by copolymerizing a mixture of a vinyl compound having a glycidyl group and an another vinyl compound in the presence of a polyester resin having carboxyl groups and thus have completed the present invention on the basis of such a finding.

According to the present invention, there is thus provided a binder for dry toners which comprises a copolymer resin obtained by reacting 10 to 50% by weight of a polyester resin which has free carboxyl groups, whose acid value ranges from 10 to 100 and whose number-average molecular weight (Mn) ranges from 1,000 to 5,000 and 90 to 50% by weight of a mixture of a vinyl compound having a glycidyl group and an another vinyl compound, wherein the amount of the vinyl compound having a glycidyl group corresponds to the number of the glycidyl groups equal to 0.25 to 1.5 times that of the carboxyl groups present in the polyester resin.

DESCRIPTION OF THE PREFERRED EMBODIMENTS

The polyester resin used in the present invention has free carboxyl groups, an acid value ranging from 10 to 100 and a number-average molecular weight (Mn) ranging from 1,000 to 5,000. Such polyester resins can be prepared by polymerizing the following polyvalent carboxylic acids and polyhydroxyl compounds in the usual manner while appropriately selecting the rate of these monomers to be used and the degree of condensation so that the acid value and number-average molecular weight of the resulting polyester fall within the ranges defined above, respectively.

The polyvalent carboxylic acids are not restricted to specific ones, but specific examples thereof usable in the present invention include maleic acid, fumaric acid, mesaconic acid, citraconic acid, itaconic acid, glutaconic acid, phthalic acid, isophthalic acid, terephthalic acid, cyclo hexanedicarboxylic acid, succinic acid, adipic acid, azelaic acid, sebacic acid, benzenetricarboxylic acid, cyclohexanetricarboxylic acid, naphthalenetricarboxylic acid, butane-1,2,4-tricarboxylic acid, hexane-1,2,5-tricarboxylic acid and acid anhydrides and alkyl esters thereof.

In addition, the polyhydroxyl compounds usable in the invention include ethylene glycol, diethylene glycol, triethylene glycol, 1,2-propylene glycol, dipropylene glycol, 1,3-butanediol, 1,4-butanediol, 1,5-pentanediol, 1,6-hexanediol, neopentyl glycol, bisphenol A, hydrogenated bisphenol A, bisphenol A modified with polyoxyethylene, bisphenol A modified with polyoxypropylene, glycerin, trimethylolethane, trimethylolpropane, pentaerythritol and 1,3,5-pentanetriol.

In the present invention, it is essential for the polyester resin to have free carboxyl groups, an acid value ranging from 10 to 100 and a number-average molecular weight (Mn) ranging from 1,000 to 5,000 and if polyester resins other than those defined above are used, the desired effects of the present invention cannot be attained More specifically, if the number average molecular weight thereof is less than 1,000, a satisfactory reinforcing effect of the polyester resin cannot be achieved and the resistance to blocking, resistance to offset of the resulting toners and the strength of the resin are all lowered, while if it is more than 5,000, the fixing ability of the toner is lowered and the linkage thereof with the resin derived from the foregoing vinyl compound mixture becomes difficult and further an increase in viscosity and gelation are possibly caused during polymerization. Therefore, the number-average molecular weight (Mn) of the polyester resin suitably ranges from 1,000 to 5,000. Further, if the acid value of the polyester resin is less than 10, the formation of the bond with the resin derived from the foregoing vinyl compound mixture likewise becomes difficult and the resulting toner has insufficient rise of electrification and pulverizing properties, while if it is more than 100, the strength of the resin is impaired. Thus, the acid value of the polyester resin suitably ranges from 10 to 100 and preferably 15 to 80.

The amount of the polyester resin used ranges from 10 to 50% by weight on the basis of the weight of the resin obtained by copolymerizing the polyester resin with the mixture of a vinyl compound having a glycidyl group and an another vinyl compound (hereinafter referred to as "hybrid resin"). This is because, if the amount of the polyester resin is less than 10% by weight, sufficient reinforcing effect of the polyester resin cannot be anticipated, a lot of fine particles are formed during pulverization of the resulting toner and the rise of electrification is also slow. On the other hand, if it exceeds 50% by weight, the resulting resin intensively exhibits the disadvantages of the polyester resin and thus the electrification under high humidity is impaired.

The hybrid resin which constitutes the binder for dry toners according to the present invention can be prepared using a polyester resin and the mixture of the vinyl compound having a glycidyl group which is required for the hybridization with the polyester resin and another vinyl compound.

Examples of the vinyl compound having a glycidyl group include allyl glycidyl ether, glycidyl acrylate and glycidyl methacrylate.

The another vinyl compound is not restricted to a specific one as long as the vinyl mixture comprises the vinyl compound having a glycidyl group and specific examples thereof are styrene, o-methylstyrene, m-methylstyrene, p-methylstyrene, 2,4-dimethylstyrene, p-n-butylstyrene, phenylstyrene, p-chlorostyrene, methyl acrylate, ethyl acrylate, n-butyl acrylate, i-butyl acrylate, t-butyl acrylate, cyclohexyl acrylate, 2-ethylhexyl acrylate, lauryl acrylate, 2-hydroxyethyl acrylate, methyl methacrylate, ethyl methacrylate, n-butyl methacrylate, i-butyl methacrylate, t-butyl methacrylate, cyclohexyl methacrylate, 2-ethylhexyl methacrylate, lauryl methacrylate, dimethylamino methacrylate, 2-hydroxyethyl methacrylate, acrylonitrile, methacrylonitrile, acrylamide, methacrylamide, ethylene, propylene, butene-1, butene-2, 1,4-butadiene, isoprene, chloroprene, vinyl chloride, vinylidene chloride, vinyl formate, vinyl acetate, vinyl propionate, vinyl caproate, methyl vinyl ether, ethyl vinyl ether, n-butyl vinyl ether, i-butyl vinyl ether, t-butyl vinyl ether, cyclohexyl vinyl ether, 2-ethylhexyl vinyl ether, dimethyl maleate, diethyl maleate, di-iso-propyl maleate, di-n-butyl maleate, di-2-ethylhexyl maleate, dimethyl fumarate, diethyl fumarate, di-n-butyl fumarate and di-2-ethylhexyl fumarate. These monomers may be used alone or in combination of 2 or more.

The amount of the vinyl compound having a glycidyl group must correspond to the number of the glycidyl groups equal to at least 0.25 time that of the carboxyl groups present in the polyester resin from the viewpoint of the reactivity with the polyester resin, but it exceeds 1.5 times the number of carboxyl groups, the electrifying properties of the resulting toner, in particular, the rate of electrification are impaired. Therefore, the vinyl compound having a glycidyl group is usually used in an amount corresponding to the number of the glycidyl groups equal to 0.25 to 1.5 times, preferably 0.5 to 1.0 time that of the carboxyl groups in the polyester resin.

As the method for hybridization of the polyester resin and the mixture of the vinyl compound having a glycidyl group and the another vinyl compound, there may be used, for instance, solution polymerization, bulk polymerization and emulsion polymerization with the solution polymerization being preferred from the viewpoint of the easiness of the reaction control.

The resulting hybrid resin preferably has a glass transition point (Tg) ranging from 50° to 70° C. This is because if Tg is less than 50° C., the problem of blocking possibly arises, while if it exceeds 70° C., the fixing ability of the resulting binder often becomes insufficient. In addition, the hybrid resin is a high quality resin and, therefore, it may be used in the form of a blend with other resins The optimum example of the resin is a styrene-acrylic resin and the resin should be blended with the hybrid resin in an amount of at most 50%. If the amount thereof exceeds 50%, the hybrid resin loses the characteristic properties thereof For instance, the resistance to pulverization of the toner resin is lowered and the rise of electrification of the resulting toner becomes slow.

The toner used in the electrophotography in which the binder for dry toners according to the present invention is incorporated may further comprise a proper pigment or dye. Specific examples thereof include carbon black, Aniline Blue, Chrome Yellow, Ultramarine Blue, Quinoline Yellow, Methylene Blue, Phthalocyanine Blue, Calcoil Blue, Malachite Green, Rose Bengale and magnetite.

The toner for electrophotography may optionally comprise any conventionally known agents for adjusting the electrifying properties. Examples thereof are Nigrosine, triphenylmethane dyes and chromium complex of 3,5-di-t-butyl salicylate. Furthermore, the toner may optionally comprise any conventionally known additives such as colloidal silica, zinc stearate, low molecular weight polypropylene, polyethylene wax and polytetrafluoroethylene. Any known method can be adopted to uniformly disperse the foregoing additives in the toner for electrophotography and to thus give fine particles of the toner.

For instance, fine toner particles can be obtained by kneading the hybrid resin in the molten state with carbon black, cooling the mixture, coarsely pulverizing the mixture and then classifying the particles with a pneumatic classfying apparatus to give particles having an average particle size ranging from 5 to 15μ.

The molecular weight, glass transition point and acid value were determined according to the following methods.

(1) Molecular weight

The molecular weight was determined by gel permeation chromatography, i.e., by dissolving 0.05 g of a sample in 20 ml of tetrahydrofuran (TMF) to form a solution, separating the solution with columns (two columns of SHODEX GPC A-80M and one column of SHODEX RI KF-802), detecting the resin with a differential refractometer (SHODEX RI SE-31) and determining the number-average molecular weight (Mn) thereof on the basis of the calibration curve obtained using the standard polystyrene.

(2) Glass Transition Point (Tg)

The glass transition point of a resin sample was determined by a differential scanning calorimeter (DSC-20, available from Seiko Co., Ltd.). More specifically, it was determined by introducing 35 mg of a sample in a container of aluminum, preliminary heating the sample up to 200° C. to remove the residual solvent and monomers and then raising the temperature at a rate of 10° C./min, from the initial temperature of 30° C., to determine the glass transition point, while using alumina as a reference substance.

(3) Acid Value

A sample accurately weighed out was dissolved in a neutralized xylene/n-butanol mixed solvent, then titrated with a 0.1 N alcohol solution of sodium hydroxide (NaOH; standard solution) whose concentration had been accurately determined to determine the amount of the standard solution required for the neutralization and thus the acid value was determined according to the following relation:

$$\text{Acid Value} = \frac{A}{B}$$

wherein

A=the amount (ml) of the alcohol solution of NaOH×F×56.1

B=the amount of the sample (9)× non-volatile content X 0.01

(wherein F means the normality of the alcohol solution of NaOH).

The present invention will hereinafter be explained in more detail with reference to the following Examples, but the present invention is by no means limited to these specific Examples.

A. Polyester Resin Preparation Examples

Preparation of Polyester Resin PEs-1

To a 5l round bottom flask equipped with a reflux condenser, an apparatus for separating water, a tube for introducing nitrogen gas, a thermometer and a stirring machine, there were added 1785 g of isophthalic acid and 1040 g of neopentyl glycol, the temperature of the contents of the flask was raised in a nitrogen gas atmosphere, followed by the addition of 7 g of dibutyl tin oxide and dehydration-condensation at 200° C. to give a polyester resin listed in the following Table-1.

Preparation of Polyester Resins PEs-2 to PEs-7

The same procedures used in the foregoing Preparation Example were repeated to give polyester resins PEs-2 to PEs-7. The composition of the resulting polyester resins and the properties thereof determined according to the foregoing methods are summarized in the following Table-1.

B. Hybrid Resin Preparation Examples

Preparation of Hybrid Resin HR-1

To a 5l round bottom flask equipped with a reflux condenser a tube for introducing nitrogen gas, a thermometer, a monomer-charging pump and a stirring machine, there were added 300 g each of the foregoing polyester resin PEs-1 and xylene and the temperature of the contents of the flask was raised up to 80° C. in a nitrogen gas atmosphere to dissolve them. There was dropwise added, to the solution, a mixture of 342.5 g of styrene (ST), 50 g of 2-ethylhexyl acrylate (2-EHA), 7.5 g of glycidyl methacrylate (GMA) and 1.0 g of azobisisobutylonitrile (AIBN). After completion of the dropwise addition, 770 g of xylene was added, the temperature of the mixture was raised to 120° C. and then a mixture comprising 685 g of ST, 100 g of 2-EHA, 15 g of GMA and 20 g of AIBN was dropwise added thereto over 2 hours. After the dropwise addition, the temperature was reduced to 80° C., the contents of the flask were maintained at that temperature for one hour, 2,4 g of AIBN was added and the mixture was allowed to stand for 2 hours to complete the polymerization. After cooling, the resulting resin was transferred to a 5l separable flask equipped with a reflux condenser, an apparatus for separating water, a tube for introducing nitrogen gas, a thermometer and a stirring machine, heated to 195° C. at 10 mm Hg for one hour to remove the solvent and to thus give a desired resin listed in the following Table-2.

Preparation of Hybrid Resins HR-1 to HR-15

The same procedures used in the preparation of HR-1 were repeated to give vinyl copolymer resins HR-2 to HR-15 except that each combination of monomers as listed in the following Table 2 was used. Properties of these resins were determined and summarized in Table-2.

EXAMPLES 1 TO 7

Binders of Examples 1 to 5 comprised the foregoing hybrid resins HR-1 to Hr-5, respectively, while those of Examples 6 to 7 comprised 8/2 and 6/4 (weight ratio) mixtures of HR-1 and HR-14, respectively.

COMPARATIVE EXAMPLES 1 TO 9

Binders of Comparative Examples 1 to 9 each comprised the hybrid resin HR-6 to HR-14 respectively.

COMPARATIVE EXAMPLE 10

The binder of this Comparative Example comprised a 4/6 (weight ratio) mixture of HR-1 and HR-14.

COMPARATIVE EXAMPLE 11

The binder of this Comparative Example comprised a product obtained by kneading 40 g of the polyester resin PEs-1 and 60 g of the hybrid resin HR-15 at 160° C. for one hour with a desk kneader (PBB-0.3 Type; available from Irie Shokai Co., Ltd.).

Using the resins thus prepared in Examples 1 to 7 and Comparative Examples 1 to 11, a toner composition was prepared by dispersing and mixing 93 parts by weight of each resin which had been coarsely pulverized into particles having a particle size ranging from 0.5 to 2 mm with a power mill available from San-ei Manufacturing Co., Ltd., 5 parts by weight of carbon black (MA-100; available from Mitsubishi Chemical Industries Ltd.) and 2 parts by weight of Spiron Black TRH (available from Hodogaya Chemical Co., Ltd.) as an agent for adjusting electrification in a Henschel mixer, kneading the mixture with a biaxial kneader to give the desired massive toner composition. After roughly pulverizing each toner composition, the composition was pulverized with a jet mill pulverizer available from Nippon Pneumatic Co., Ltd., then classified to give toner particles having an average particle size of 10μ (5~20μ≧95%). Two parts by weight of the resulting toner particles were mixed with 98 parts by weight of Ferrite Carrier (F-95-100; available from Nippon Iron Powder Co., Ltd.) to give a developer. The quality of the resulting toner was evaluated according to the following methods. The results obtained are summarized in Table-3.

Evaluation of Quality of Toners

(1) PULVERIZING PROPERTIES

The particle size distribution of each toner which had been pulverized by a jet mill pulverizer was determined by Coulter Counter TA II available from Coulter Electronics Company and the properties of the toners were evaluated in terms of the rate of the particles having a particle size falling within the optimum range (5 to 20 μ) on the basis of the following 4-stage criteria:

◎: Rate of Particles having $R_{op}$ ≧85%
○: Rate of Particles having $R_{op}$70~85%
Δ: Rate of Particles having $R_{op}$50~70%
X : Rate of Particles having $R_{op}$≦50%
$R_{op}$: The optimum particle size.

(2) RESISTANCE TO BLOCKING

Each toner sample (5 g) was introduced into a 10 cc polyethylene bottle and allowed to stand at 50° C. for one week. The resistance to blocking of the sample thus treated was evaluated on the basis of the following 3-stage criteria:

○: Blocking was not observed.
Δ: Masses were present in a small amount, but easily destroyed upon touching with the hand.
x: Masses were present in a large amount.

(3) Rise of Electrification

A mixture of each finely pulverized toner sample and Ferrite Carrier (F-95-100; available from Nippon Iron Powder Co., Ltd.) was allowed to stand at 22° C. and a relative humidity of 35% for 24 hours. Then 2 g of the resin and 98 g of the carrier were rotated in a V-blender (micro type see-through mixer; available from tsutsui Physicochemical Apparatus-Manufacturing Co., Ltd.) at 45 rpm within a chamber maintained at 22° C. and a relative humidity of 35% and sampling was performed after 10, 20, 30, 60, 120 and 180 minutes. The mixture (about 0.2 g) thus sampled was taken and the quantity of electrification thereof was determined using Blow-Off Apparatus (available from Toshiba Chemical Corporation) and the result obtained was reduced to the quantity of electrification per 1 g of the resin. The rise of electrification was evaluated on the basis of the following 4-stage criteria:

T ◎: $T_{ST}$≦10 min
T ○: $T_{ST}$10~20 min
T Δ: $T_{ST}$20~30 min
x : $T_{ST}$≧30 min
$T_{ST}$: The stirring time needed for achieving the quantity of electrification of 10 to 20 μC./g and for stabilizing it at that value.

(4) Electrifying Properties Under High Humidity

A sample was allowed to stand at a relative humidity (RH) of 85% for 24 hours, then the quantity of electrification thereof at 35° C. and RH of 85% was determined in the same manner used above in (3) and the electrifying properties of the sample was evaluated in terms Of the ratio of the quantity of electrification at a stirring time of 60 minutes to that observed at 22° C. and RH of 35% on the basis of the following 4-stage criteria:

◎: ≧85%
○: 60 to 80%
Δ: 40 to 60%
x : ≦40%

(5) Low Temperature Fixing Ability and Offset Temperature

A commercially available copying apparatus (DC-313Z; Mita Industrial Co., Ltd.) was remodeled so that the temperature of the hot rolls could arbitrarily be selected. Copying operations were continuously performed 10 times while changing the temperature of the hot rolls, cellophane tape peeling off test was carried out for each copy to determine the temperature at which any toner particles were not transferred to the surface of the cellophane tape at all and this temperature was defined to be the lowest fixing temperature. The temperature of the hot rolls was further raised to determine the offset temperature.

TABLE 1

Polyester Resins Prepared in Preparation Examples

| PEs No. | Composition of Polyester Resin (PBW): IPA | DMT | NPG | DBTO | —COOH/—OH | Properties of Resin: Mn | Acid Value |
|---|---|---|---|---|---|---|---|
| 1 | 1785 | — | 1040 | 7 | 1.075 | 3020 | 37.2 |
| 2 | 915 | 1060 | 1040 | 7 | 1.100 | 2530 | 22.2 |
| 3 | 480 | 1675 | 1040 | 7 | 1.150 | 1600 | 17.5 |
| 4 | 1665 | — | 1040 | 7 | 1.003 | 6780 | 16.6 |
| 5 | 1080 | 1260 | 1040 | 7 | 1.300 | 910 | 9.2 |
| 6 | 445 | 1565 | 1040 | 7 | 1.075 | 3050 | 69.6 |

TABLE 1-continued

| Polyester Resins Prepared in Preparation Examples | | | | | | | |
|---|---|---|---|---|---|---|---|
| | Composition of Polyester Resin (PBW) | | | | | Properties of Resin | |
| PEs No. | IPA | DMT | NPG | DBTO | —COOH/—OH | Mn | Acid Value |
| 7 | 1700 | — | 1040 | 7 | 1.024 | 1030 | 109.0 |

IPA: isophthalic acid
DMT: dimethyl terephthalate
NPC: neopentyl glycol
DBTO: dibutyl tin oxide
Mn: number-average molecular weight
PBW: part by weight

TABLE 2

| Hybrid Resins Prepared in Preparation Examples | | | | | | | | | | |
|---|---|---|---|---|---|---|---|---|---|---|
| | Polyester Resin | | Vinyl Monomer Composition (wt %) | | | | | Ratio | Tg |
| No. | Kind | wt % | ST | 2-EHA | n-BA | GMA | MAc | (G/C) | (°C.) |
| HR-1 | PEs-1 | 20 | 68.5 | 10.0 | — | 1.5 | — | 0.790 | 61.0 |
| HR-2 | PEs-1 | 30 | 59.0 | 8.5 | — | 2.5 | — | 0.885 | 60.5 |
| HR-3 | PEs-1 | 40 | 50.0 | 7.0 | — | 3.0 | — | 0.797 | 59.5 |
| HR-4 | PEs-2 | 30 | 58.5 | — | 10.0 | 1.5 | — | 0.890 | 61.5 |
| HR-5 | PEs-3 | 30 | 58.5 | — | 10.5 | 1.0 | — | 0.753 | 59.5 |
| HR-6 | PEs-1 | 6 | 81.5 | 12.0 | — | 0.5 | — | 0.886 | 62.0 |
| HR-7 | PEs-1 | 60 | 31.5 | 3.5 | — | 5.0 | — | 0.885 | 58.0 |
| HR-8 | PEs-1 | 30 | 60.5 | 9.0 | — | 0.5 | — | 0.177 | 60.5 |
| HR-9 | PEs-1 | 30 | 55.5 | 6.5 | — | 8.0 | — | 2.832 | 59.5 |
| HR-10 | PEs-4 | 30 | 58.5 | — | 10.5 | 1.0 | — | 0.793 | gel |
| HR-11 | PEs-5 | 30 | 58.0 | 7.5 | — | 4.5 | — | 0.851 | 61.0 |
| HR-12 | PEs-5 | 30 | 60.5 | 9.0 | — | 0.5 | — | 0.716 | 61.5 |
| HR-13 | PEs-7 | 30 | 56.0 | 7.0 | — | 7.0 | — | 0.846 | 59.5 |
| HR-14 | — | — | 85.0 | 13.0 | — | — | 2.0 | — | 60.5 |
| HR-15 | — | — | 84.3 | 12.1 | — | 3.6 | — | — | 59.5 |

ST: styrene
2-EHA: 2-ethylhexyl acrylate
n-BA: n-butyl acrylate
GMA: glycidyl methacrylate
MAc: methacrylic acid
Ratio (G/C): Number of glycidyl groups in the vinyl compound/number of carboxyl groups in the polyester resin.

TABLE 3

| Results of Quality Evaluation of Toners | | | | | | | |
|---|---|---|---|---|---|---|---|
| | | | | | | Electrification | |
| Ex. No. | Resin Used | Pulverizing Properties | Resistance to Blocking | Lower Limit of Fixing Temp. (°C.) | Offset Temp. (°C.) | Increase | Under High Humidity |
| 1 | HR-1 | ○ | ○ | 100 | 225 | ○ | ◎ |
| 2 | HR-2 | ◎ | ○ | 105 | 230 | ◎ | ○ |
| 3 | HR-3 | ○ | Δ | 110 | 235 | ◎ | ○ |
| 4 | HR-4 | ◎ | ○ | 105 | 235 | ○ | ◎ |
| 5 | HR-5 | ○ | ○ | 110 | 230 | ○ | ◎ |
| 6 | HR-1/HR-14 = 8/2 | ◎ | ○ | 105 | 225 | ○ | ◎ |
| 7 | HR-1/HR-14 = 6/4 | ○ | ○ | 110 | 215 | Δ | ◎ |
| 1* | HR-6 | X | ○ | 90 | 175 | X | ○ |
| 2* | HR-7 | Δ | X | 150 | ≧240 | ◎ | X |
| 3* | HR-8 | Δ | X | 105 | 210 | Δ | X |
| 4* | HR-9 | X | ○ | 110 | 230 | X | Δ |
| 5*[1)] | HR-10 | — | — | — | — | — | — |
| 6* | HR-11 | Δ | Δ | 100 | 190 | Δ | X |
| 7* | HR-12 | X | Δ | 100 | 215 | Δ | ◎ |
| 8* | HR-13 | Δ | ○ | 105 | 205 | Δ | X |
| 9* | HR-14 | Δ | ○ | 120 | 200 | X | ◎ |
| 10* | HR-1/HR-14 = 4/6 | ○ | ○ | 115 | 210 | X | ◎ |
| 11* | PEs-1/HR-15 = 4/6 | ○ | Δ | 120 | 195 | X | Δ |

*Comparative Example
[1)]In Comparative Example 5, the properties were not determined since the resin caused gelation.

The data listed in the foregoing Tables clearly indicate that if the binder for dry toners according to the present invention is used, the resulting toners exhibit good pulverizing properties, resistance to blocking, low temperature fixing ability, resistance to offset, rise of electrification and electrification under high humidity and hence are excellent as binders for toners.

We claim:

1. A binder for dry toners comprising a copolymer resin obtained by reacting 10 to 50% by weight of a polyester resin which has free carboxyl groups, whose acid value ranges from 10 to 100 and whose number-average molecular weight ranges from 1,000 to 5,000 and 90 to 50% by weight of a mixture of a vinyl compound having a glycidyl group and another vinyl compound, wherein the amount of the vinyl compound having a glycidyl group corresponds to the number of the glycidyl groups equal to 0.25 to 1.0 time that of the carboxyl groups present in the polyester resin.

2. The binder for dry toners as set forth in claim 1 wherein the acid value of the polyester resin ranges from 15 to 80.

3. The binder for dry toners as set forth in claim 1 wherein the vinyl compound having a glycidyl group is a member selected from the group consisting of allyl glycidyl ether, 4. The binder for dry toners as set forth in claim 1 wherein the glass transition point of the copolymer resin ranges from 50° to 70° C.

* * * * *

UNITED STATES PATENT AND TRADEMARK OFFICE
CERTIFICATE OF CORRECTION

PATENT NO. : 5,241,019

DATED : August 31, 1993

INVENTOR(S) : Tateo OTSUKI et al

It is certified that error appears in the above-identified patent and that said Letters Patent is hereby corrected as shown below:

Claim 3, column 10, line 64, after "ether" add

--glycidyl/acrylate and glycidyl methacrylate.--

Signed and Sealed this

Thirty-first Day of May, 1994

Attest:

Bruce Lehman

BRUCE LEHMAN

*Attesting Officer*

*Commissioner of Patents and Trademarks*